United States Patent [19]

Cressey, Jr.

[11] 4,024,313
[45] May 17, 1977

[54] PAPER WEB COATED WITH AN ALL-LATEX ADHESIVE COATING COMPOSITION

[75] Inventor: Philo Burton Cressey, Jr., Gorham, Maine

[73] Assignee: Scott Paper Company, Philadelphia, Pa.

[22] Filed: Aug. 1, 1975

[21] Appl. No.: 601,202

Related U.S. Application Data

[62] Division of Ser. No. 439,955, Feb. 5, 1974, abandoned, which is a division of Ser. No. 218,012, Jan. 14, 1972, Pat. No. 3,832,216.

[52] U.S. Cl. .............................. 428/355; 428/511; 428/514; 428/537
[51] Int. Cl.² ...................... C09J 7/02; B32B 23/08
[58] Field of Search ........................ 156/332, 333; 260/29.6 RB, 29.7 R, 901; 162/135, 168; 428/355, 511, 514, 537; 427/362

[56] References Cited

UNITED STATES PATENTS

| | | | |
|---|---|---|---|
| 3,028,258 | 4/1962 | Rice | 427/362 |
| 3,170,888 | 2/1965 | Kutik et al. | 260/29.6 |
| 3,377,192 | 4/1968 | Kirk et al. | 427/362 X |
| 3,513,121 | 5/1970 | Heaton | 260/29.7 |
| 3,600,215 | 8/1971 | Mervine | 427/362 |
| 3,694,394 | 9/1972 | Freeman | 260/29.7 W |
| 3,719,628 | 3/1973 | Bergomi et al. | 260/29.7 W |
| 3,784,401 | 1/1974 | Wheelock | 427/341 |
| 3,788,878 | 1/1974 | Wheelock | 427/341 |
| 3,809,666 | 5/1974 | Chick et al. | 260/29.7 W |

FOREIGN PATENTS OR APPLICATIONS 862,188  1/1971  Canada

Primary Examiner—P.E. Willis, Jr.
Attorney, Agent, or Firm—J. A. Weygandt; R. D. Vickrey

[57] ABSTRACT

A paper web having an adhesive composition coated thereon wherein the adhesive consists essentially of latices, at least one being alkali-swellable or alkali-soluble and at least one not being alkali-swellable or alkali-soluble, the pH of the composition being such that the alkali-swellable or alkali-soluble latex remains in the unswelled or undissolved condition.

2 Claims, No Drawings

PAPER WEB COATED WITH AN ALL-LATEX ADHESIVE COATING COMPOSITION

This is a division of application Ser. No. 439,955, filed Feb. 5, 1974, now abandoned, which is a division of application Ser. No. 218,012 filed Jan. 14, 1972, now U.S. Pat. No. 3,832, 216.

BACKGROUND OF THE INVENTION

1. Field of the Invention

The present invention relates to aqueous paper coating compositions containing latex as the sole adhesive and methods of coating using such compositions, especially the cast coating of paper and paperboard.

2. Description of the Prior Art

Paper coating compositions comprise two essential elements: a pigment and an adhesive or binder which bonds the pigment to the paper base. The cast-coating method of coating paper comprises applying an aqueous composition to a paper web or substrate; pressing the coated surface of the paper against a polished, heated, finishing drum; and maintaining the coated surface of the paper web in intimate non-slipping contact with the drum by adhesion until the coating has dried, whereupon the paper is separated from the drum. This process produces the mirror image of the finishing drum surface on the coated surface of the paper. As a result, the coated paper thus produced has very high gloss and may actually exhibit increased bulk over the uncoated basestock which results from the introduction of moisture into the swellable, fibrous bodystock during the coating and finishing steps.

In the cast-coating method as practiced by the present inventor, the surface of the finishing drum is higher than 100° C, e.g., from 120° to 150° C, and the pressure in the nip where the coated paper is pressed against the finishing drum is greater than the vapor pressure of water at said temperature, all as taught by Hart in U.S. Pat. No. 2,919,205, assigned to the assignee of the present invention. Additionally, in employing the coatings of the present invention, a pool of boiling water is maintained in the casting nip. Steam evolving from this pool precludes air from the nip and prevents the formation of air bubbles in the coating. Moisture provided by the steam and boiling water also serves to rewet the coating just before contact with the casting drum, thus promoting good bonding of the coating to the drum surface. See U.S. Pat. No. 2,950,989 to Freeman assigned to the assignee of the present invention.

As a result of the inventions just described, cast coating speeds far faster than those taught by the prior art up to that time were made possible. This speed increase was due to the greater drying capacity available when casting drum temperatures were elevated above 100° C. Hart increased nip pressures above the vaporization point of water at a given temperature in order to avoid too-sudden vaporization of water in the coating and basestock at these elevated temperatures and resultant violent disruption of the coated paper web. Shortly afterward, Freeman found unexpectedly that steam and boiling water could be utilized in the casting nip without causing excessive wetting and subsequent disruption of the cast paper surface. Although these techniques of Hart and Freeman permitted far faster operation (250 feet per minute or more) than was thought possible in the prior art, such extreme conditions of heat and pressure in the presence of nip moisture placed great physical demands upon the coating employed.

In order to obtain maximum benefits from the Hart and Freeman teachings, coatings were developed which were gelled or coagulated before reaching the casting nip and thus had greater resistance to the disruptive nip forces. In addition, such coatings were water resistant, and not subject to wash-off when brought into contact with a pool of boiling water in the casting nip. These gelled coatings have been of two basic types: acid-gelled, such as are described in U.S. Pat. No. 3,078,181, and heat-gelled, of the type taught by U.S. Pat. No. 3,356,517, both assigned to the assignee of the present invention. Such coatings have produced excellent end products when employed in conjunction with the teachings of the Hart and Freeman patents previously cited, and most recent research in cast coating has been done with gelled coatings of one type or the other.

Such gelled coating systems are not without disadvantages however. As set forth in U.S. Pat. No. 3,356,517, Column 2, lines 20–41, the acid-gel systems suffer from sensitivity of pH control and from the corrosive effects of the acid employed. The heat-gel systems recommended by this same U.S. Pat. No. 3,356,517 and those of U.S. Pat. No. 3,377,192 are themselves subject to difficulties, although of a different sort. Extremely careful control must be maintained over coating composition quantities and method of addition of components in order to make possible the desired gelation. Temperature must be controlled within narrow limits, both during coating formulation and application. Such coatings are even sensitive to ambient conditions, especially during hot, summer weather. The complexity of the coatings and order of addition necessitates long make-up times, with nearly constant attention from an operator. Such a time factor adds undesirably to labor costs.

For all of the foregoing reasons it would be highly desirable to eliminate the requirement for gelled coatings in the cast coating art, yet retain the advantages of high operating speeds which such coatings have made possible when employed in conjunction with high temperature and pressure conditions. Until the present invention, non-gelled coatings have been failures under the temperature and pressure conditions of high-speed casting for the reasons previously cited — insufficient cohesiveness to withstand the disruptive forces in the nip, and solubility in the nip liquid. The present invention overcomes these difficulties and provides a coating composition which may be cast at speeds of 300 feet per minute or more at high temperature and pressure conditions but without the need for gelling the coating.

A further problem of the cast-coating art, encompassing both the earlier ungelled systems and the more recent gelled ones, has been the dependence of the art upon casein for successful casting. While as disclosed in the aforementioned U.S. Pat. Nos. 3,356,517 and 3,377,192, it is possible for the binder in a gellable coating composition to consist solely of latices it is still commercially preferred to employ a minor proportion of casein in the adhesive. Casein aids good bonding of the coating surface of the casting drum and it gives up water readily when heated. These characteristics prevent the formation of pits on the cast surface as moisture transpires through the back of the web while it is in contact with the casting drum. The use of casein, however, is attended by a number of drawbacks. One is that in order to make up a casein-based composition, it is necessary first to dissolve the casein in water which is then heated gently to a temperature not to exceed 60° C. Careful control of the heating is required in order not to degrade the casein during the heating step. An alkali is then added to the casein solution, and the resulting solution is then added to a dispersion of the pigment.

Another disadvantage of systems containing casein, affecting gelled and ungelled systems alike, is that the price and supply of casein are subject to wide fluctuations. At present, casein for paper coating purposes is becoming virtually unobtainable. It is obvious that for ease of process operation and economic reasons it would be a great improvement in the cast-coating art if casein could be totally eliminated in all types of casting systems.

Attempts to replace the casein with a synthetic resin latex or emulsion have not heretofore met with success in ungelled cast-coating compositions because such formulations are not sufficiently water-loving to cast well on the drum; that is, the coating in its wet condition will not properly adhere to the surface of the finishing drum. In the language of the art, it will not wet out. This adhesion problem is worsened as operating speeds are increased and additional heat is necessitated to dry the coating partially prior to contact with the casting drum. Most latices cross-link or coalesce under the effects of such heat and the coated paper surface is even less hydrophilic when it reaches the casting drum after heating than it is at ambient temperature.

One type of coating composition which has successfully eliminated the need for casein in the paper coating art apart from cast coating is that embodying the use of the so-called alkali-swellable or alkali-soluble latices. See U.S. Pat. No. 3,513,121 granted May 19, 1970. This patent discloses a composition for coating paper comprising an aqueous dispersion of pigment, an adhesive composition comprising a blend of copolymer latices one of which is capable of being rendered soluble by alkali and one of which is not capable of being rendered soluble by alkali, and sufficient alkali to dissolve the alkali soluble latex. This coating composition, however, has not shown itself to be useful in cast coating since the binder component becomes coalesced in the alkaline medium prior to reaching the casting drum.

An adhesive composition for use in coating paper comprising a blend of latices, one of which is capable of being swelled by alkali and the other of which is insoluble and not swellable to any substantial extent in aqueous alkali has heretofore been proposed. See Canadian Pat. No. 862,188. Another patent which discloses the use of an alkali-swellable latex as an adhesive for a paper coating composition is U.S. Pat. No. 3,409,569. These patents teach, however, that in order to obtain the necessary coating viscosity sufficient alkali must be added to the paper coating composition to swell the latex. When such a coating composition is employed in the cast coating method of the present invention, the binder of the coating composition has shown a tendency to absorb water, swell, and thus coalesce prior to the time the coated web comes into contact with the heated casting drum surface. The coating therefore fails to cast when brought into contact with the finishing surface of the casting drum.

SUMMARY FOF THE INVENTION

It is therefore an object of this invention to provide an aqueous coating composition in which the adhesive component consists of latices of synthetic organic polymers.

It is another object of the invention to provide aqueous cast-coating compositions which may be processed at high speeds and which need not be gelled, in which the adhesive consists of a blend of alkali-swellable or alkali-soluble and non-alkali-swellable or non-alkali-soluble polymers.

The present inventor has found that if the alkali-swellable or alkali-soluble latex-containing coating compositions of the above-described patents are not neutralized and are used in their acid or non-swelled or undissolved condition, excellent cast coating results are obtained. This is completely opposed to all the teachings of the art, as indicated by the above-cited patents, which have consistently recommended the use of alkali-swellable or alkali-soluble materials in their alkaline state only. Thus, it may be seen that although workers of extraordinary skill in the paper-coating art have been working with alkali-swellable or alkali-soluble latices for more than five years, none of them has perceived any advantage in the cast coating of paper to employ these latices in a manner opposite to that of their intended use.

Accordingly, the present invention comprises an aqueous coating composition in which the adhesive component consists essentially of a mixture of a latex which is not capable of being swelled or rendered soluble by alkali and a latex which is capable of being swelled or rendered soluble by alkali. It will, of course, be appreciated that the invention is not limited to mixtures of only two latices of which one is alkali swellable or soluble and the other is unaffected by alkali. The use of three or more different latices can be employed to adjust the properties of the adhesive as desired. Thus, the adhesive component of the coating composition of the present invention broadly comprises a mixture of latices of which at least one is insoluble in aqueous alkali solution and at least one is swellable or soluble in aqueous alkali solution.

Further in accordance with the present invention, the aqueous coating composition is maintained at a pH which is acidic throughout the coating and casting process. At acidic pH the alkali-swellable or alkali-soluble latex remains in the unswelled or undissolved condition, and thus uncoalesced until the coated paper surface reaches the casting drum. All of the latices of the present invention which the present inventor has studied become water swollen and coalesced at pH's above 7, and many of the most effective systems have shown a tendency to coalesce at a pH of about 6.5 and above. It is theoretically possible that a polymer could be designed which would remain in its free-acid state until a pH substantially above 7 was reached, but none of these has come to the attention of the inventor. by maintaining the pH of the entire coating composition at an acidic level the minor proportion of alkali-swellable or alkali-soluble latex will remain hydrophilic, thus permitting the coated paper surface to adhere firmly to the casting drum. Once the coated paper surface is cast firmly against the drum, coatings containing the latices of the present invention give up water readily, thus permitting rapid drying, good release from the drum and high operating speeds.

According to another aspect of the invention, a method of cast coating paper is provided wherein the coating composition is applied to the paper web and directly conveyed to the casting nip without the necessity of gelling or flocculating the coating.

The adhesive component of the paper coating composition of the present invention comprises a major proportion of non-alkali-swellable or soluble latex and a minor proportion of alkali-swellable or soluble latex. Although spoken of as a part of the adhesive component of the paper coating, the alkali-swellable or soluble latex is required primarily for its hydrophilic properties in its acidic state, and not for strength-imparting properties. While these alkali-swellable or alkali-soluble materials are strong adhesives in the alkaline condition in which they were intended to be used, they have relatively little strength at acid pH. Most of the binding strength of the adhesive component in the coating composition must therefore be provided by the non-alkali-swellable or non-alkali-soluble latex component of the binder. Too high a percentage of the alkali-swellable or soluble material tends to reduce several strength values of the coated paper, particularly wet pick strength and web rub.

To provide adequate coating strength, the alkali-swellable or soluble latex will generally comprise from 2 to 50% of the binder component of the coating composition, and preferably from about 20 to about 40%. The alkali-swellable or soluble latex of the present invention may be any polymer to which sufficient carboxyl groups may be attached to produce strong acidity. For reasons of economy and polymer strength, acrylic copolymers, styrene-butadiene copolymers or vinyl acetate copolymers have been the commercially available polymers found useful as the alkali-swellable or alkali-soluble latex. The non-alkali-swellable or non-alkali-soluble latex of the adhesive component may be copolymers of styrene-butadiene, styrene-isoprene, styrene-vinyl acetate, acrylics, vinyl acetates, vinyl chloride-acrylic, styrene-nitrile, or nitrile-acetate. The pigment component may be any of the commonly used paper coating pigments, including domestic and foreign clays, hydrated alumina, calcium carbonate, or combinations thereof.

In the following example the teachings of the prior art as represented by the above-cited patents, U.S. Pat. No. 3,513,121 and Canadian Pat. No. 862,188, were applied to the cast coating of paper.

EXAMPLE I

A coating composition was made by adding the following ingredients under agitation to 200 parts by weight of water: 100 parts by dry weight of a paper-coating quality clay, 0.6 parts by dry weight of sodium acid pyrophosphate and 0.2 parts by dry weight of an anionic, water-soluble polymer (sold commercially by the NOPCO Chemical Division of the Diamond Shamrock Company under the designation Nopcosant L) both as dispersants for the clay, 1 part by dry weight of a defoamer for latex (sold commercially by Colloids, Inc. under the designation Colloid 680), and 0.5 part by dry weight of a nonionic surface active agent as a stabilizer. Then were added binder components consisting of 18 parts by dry weight of an alkali insoluble and unswellable latex (B-15, a soft acrylic copolymer manufactured by Rohm and Haas) and 7 parts by dry weight of an alkali-swellable latex (E-503, an emulsion of an acrylic copolymer manufactured by Rohm and Haas). The alkali-insoluble latex was added to the coating composition prior to the addition of the alkali-swellable emulsion.

The alkali-swellable emulsion was received from the supplier at a pH of 2. It was maintained at this pH until after it was added to the other coating ingredients, in order to prevent difficulty in incorporating the latex into the coating. If the alkali-swellable latex had been thickened by the addition of alkali prior to the time the latex was added to the coating it would have coalesced and become so viscous that it could be worked into the coating only with great difficulty.

Immediately prior to the addition of the unmodified alkali-swellable latex to the coating composition, the pH of the composition was 5.6. Addition of the 7 parts by dry weight of the unmodified alkali-swellable latex reduced the pH of the entire coating composition to 5.0. This pH increased slightly to 5.15 when 0.13 part by dry weight of polyethylene was added as a release agent for the coating.

After these ingredients had been thoroughly mixed, 1.51 parts by weight of ammonium hydroxide (28% ammonia) were added to the coating composition as an alkaline thickener for the alkali-swellable emulsion. The addition of the ammonia caused the coating to thicken markedly, and raised the pH of the coating to 8.5. Forty additional parts by weight of water brought the coating solids to 41.6%.

This coating composition was applied to a conventional coating base paper and the coated surface was pressed against a casting drum, the surface of which was maintained at a temperature of 240° F. After the coated paper was dry enough to release from the casting drum, it was removed from contact with the drum and subsequently examined for surface quality. The coated paper surface exhibited a mottled, uneven appearance, indicating that it had not cast properly against the finishing drum. The coated surface had a gloss reading of 57 at a 75° angle on a Hunter Glossmeter.

The following examples illustrate the advantages of the present invention in comparison to the prior art.

EXAMPLE II

A slurry was prepared from 100 parts by weight of English coating clay, 100 parts by weight of water and 0.7 parts by weight of sodium tetraphosphate as a dispersant for the clay. This mixture was slurried for 20 minutes, following which were added 0.25 part by dry weight of a defoamer, Drew L-501, manufactured by Drew Chemical Company, and 0.13 part by dry weight of polyethylene as a lubricant.

To this composition were added 15 parts by dry weight of a non-alkali swellable or soluble latex, B-15, a soft acrylic copolymer manufactured by Rohm and Haas Company; and 5 parts by dry weight of an alkali-soluble latex, ASE 95, an acrylic emulsion copolymer manufactured by Rohm and Haas Company.

The alkali-soluble latex was received from the supplier at a pH of 3.4 and was added directly to the coating composition without modification. When the emulsion was added to the coating composition no appreciable thickening of the coating was observed. After this addition, the entire mixture was maintained under continuous agitation until a homogeneous composition was obtained. This coating composition had a pH of 5.2, its solids content was 41.4%, electric water retention (EWR) time was 1.25 seconds and viscosity at 100

RMP was 480 centipoises. In this and the following examples, viscosity was measured with a Brookfield Model RVF-100 viscometer using the No. 5 spindle. Water retention was determined by measuring the electrical conductivity through a sheet of water leaf paper pressed against the coating. As the water migrates from the coating into the sheet of paper, the conductivity increases. The values given represent the time required for the conductivity to reach 0.5 milliamp.

The above-described coating was applied by means of an air knife coater to one side of an 8 point Cover Bristol bodystock which had previously been surface sized on the side to be coated. The coating was applied in an amount equal to 14 pounds per ream of 3300 square feet. Web speed during the coating and casting operations was 105 feet per minute.

Following the application of the coating, the web passed from the coating station past a series of infra-red heaters which served to dry the coated sheet partially prior to reaching the casting drum, but which produced no gelation or coalescence of the coating prior to the entry of the web into the casting nip. The web passed through a nip comprised of a backing roll and a chromium-surfaced casting drum with a four foot diameter. In the nip, a vigorously boiling pool of water was maintained at 220° F. This boiling pool produced a large amount of steam which rose above the nip entrance. After passing through the steam, boiling pool and casting nip itself, the coated paper surface cast firmly against the drum surface. As the drum revolved, the paper was maintained in intimate adherent contact with the drum surface for the greater portion of a revolution around the drum. The drum, heated to 260° F dried the paper to a total moisture content of approximately 4% after the paper had remained in contact with the drum surface for approximately three-quarters of a revolution of the drum. At that point, the coated web released cleanly from the drum and was wound up. The cast coated paper thus produced had excellent qualities of gloss and sparkle to the naked eye, and had a gloss reading of 75 when measured at a 75° angle on a Hunter Glossmeter. Microscopic examination of the coated surface showed that the coating was uniform and continuous. The coating was found to be substantially free from pits or other surface defects.

EXAMPLE II

A slurry was prepared by combining 55 parts by weight of water with, by dry weight, 0.3 part tetrasodium pyrophosphate and 100 parts English coating clay. After slurrying for 20 minutes, there was added by dry weight 0.025 part of a defoamer, 15 parts of a non-alkali swellable latex, the soft acrylic copolymer described in Example II, and finally 10 parts of an alkali-soluble latex, ASE 75, an acrylic emulsion copolymer manufactured by Rohm and Haas Company.

This coating composition had a pH of 5.8. Its electric water retention (EWR) was 4.8 seconds, and its viscosity at 100 RPM was 302 centipoises. The coating had a solids content of 56%. Under the operating conditions of Example II, it was applied to a casein surface sized bodystock in an amount equal to 13 pounds per 3300 square feet. No gelation of the coating occurred although the coated surface was heated to approximately 200° F between the coating station and the casting drum, as an aid to drying. The coated paper was pressed against the heated casting drum, which was maintained at a temperature of 264° F. It cast well against the drum, at an operating speed of 200 feet per minute and when removed from the finishing surface of the casting drum the coated paper exhibited at 75° gloss reading of 88.

EXAMPLE IV

Employing the same basic formula and operating conditions set forth in Example III, the ASE 75 alkali-swellable emulsion was replaced by ASE 60, and acid-containing, acrylic emulsion copolymer, manufactured by Rohm and Haas Company. This alkali-swellable material, when used in the same minor proportion (40% of the binder component) to the major proportion of non-alkali swellable latex (B-15 — 60% of the binder component) as in Example III, produced a castable sheet with excellent surface characteristics and a 75° gloss reading of 91.

In further experiments, other alkali-swellable or soluble polymers were employed instead of the ASE series of materials used in the examples already described. The alkali-swellable emulsion of acrylic copolymer (E-503 manufactured by Rohm and Haas) which was unsuccessfully tried in Example I when used according to manufacturer's instructions, proved to be a highly desirable binder component in a cast coating composition when employed in an unmodified acidic state.

Poly(carboxyl acid) thickener (Tylac 9504 manufactured by Standard Brands), alkali-soluble poly(vinyl acetate), poly(vinyl acetate)-acrylic copolymer and modified styrene-butadiene were each used individually in conjunction with the control formulation of Example III, including the same non-alkali swellable binder material. Each of these formulations cast well and produced sheets with excellent visual characteristics.

In further experiments performed under the conditions of Example III, the B-15 acrylic copolymer was removed and other latices substituted in the same proportion relative to the ASE-75 alkali-swellable emulsion. Several styrene-butadienes were each combined individually in a castable coating composition with the alkali-swellable emulsion. These included uncarboxylated styrene-butadiene (Dow Chemical Company's 612), slightly carboxylated (Dow's 620), and a high styrene to butadiene copolymer (Standard Brands' Tylac 5071).

Other types of polymers employed as the non-alkali swellable component in the same control formula were styrene-isoprene, styrene-acetate, polyacrylics, acrylic-styrene, poly(vinyl acetate) copolymers, poly(vinyl acetate) terpolymers, vinyl chloride-acrylics, nitrile-acetate, and styrene-nitrile. All of these copolymers were successfully utilized as the major, non-alkali swellable binder component of a cast coating composition containing a minor binder proportion of an alkali swellable latex.

EXAMPLE V

To 55 parts by weight of water were added by dry weight 0.3 part by weight of tetrasodium pyrophosphate, 100 parts of paper coating clay, 0.25 part of a defoamer, 0.25 part of polyethylene as a release agent, and, as a binder component, 18 parts of a non-alkali swellable latex, the soft acrylic copolymer described in Example II and 2 parts of an alkali soluble, poly(vinyl acetate) latex, (RV 225-5B manufactured by the General Latex & Chemical Company). This coating composition, with a high ratio of non-alkali soluble to alkali soluble binder components, had the following characteristics: pH 6.8, EWR 3.8 seconds, and Brookfield viscosity at 100 RPM, 120 centipoises. This coating was applied at 57.6% solids, did not gel when heated prior to the casting drum, and cast well against the heated drum. The coated paper released cleanly from the drum when dry. It exhibited good visual gloss.

EXAMPLE VI

To 100 parts by weight of water were added, by dry weight, 100 parts of domestic, coating-quality clay and 0.5 part of a dispersant for the clay. This mixture was slurried for 20 minutes, at which point 0.25 part of a defoamer, 10 parts by dry weight of the non-alkali swellable latex of Example II, 0.25 part of polyethylene as a release agent, and 10 parts by dry weight of the alkali-swellable latex of Example II were added. This composition had a pH of 4.65, a viscosity at 100 RPM of 480 centipoises and an EWR of 1.5 seconds. It was applied at 42.4% solids to a casein surface sized Cover Bristol bodystock in an amount equal to 13 pounds per 3300 square feet. The coated sheet cast well and had a finished appearance that was satisfactory although somewhat less desirable then those of the preceding examples where less alkali-soluble latex was employed.

EXAMPLE VII

Due to the basic pH of several components normally present in paper coating compositions, all-latex cast coating compositions to which an unmodified alkali-swellable or alkali soluble latex has not yet been added may have a pH at or above the neutral 7.0. A sudden change in the viscosity and homogeneity of the coating, called "shocking," may occur when a strongly acidic, unmodified, alkali-swellable or soluble latex is added. In order to avoid this problem, it is desirable, in some formulations and under some operating conditions, to add a buffering ingredient which will lower the pH of a neutral or alkaline coating somewhat prior to the addition of the unmodified alkali-swellable or soluble latex. This practice is illustrated as follows.

A slurry of 200 parts by weight of water and 300 parts by dry weight (60% solids) of a domestic, coating-quality clay had a pH of 7.2. After the addition of 1.75 parts by weight of a defoamer (Drew Chemical Company's L-501) and 45 parts by dry weight of the non-alkali swellable latex of Example II, the pH of the composition was 6.1. The composition was then buffered against the addition of the alkali-swellable latex by the addition of 1 part by dry weight of succinic anhydryde (pH 4.2). This lowered the pH of the entire composition to 4.6. Addition of 30 parts by dry weight of the alkali-swellable latex of Example III (pH 3.0) reduced the final pH of the composition to 4.2. No radical changes in the coating composition were noted when the alkali-swellable latex was added in this manner.

While the invention has been particularly shown and described with reference to preferred embodiments thereof, it is understood that various other changes and modifications thereof will occur to a person skilled in the art without departing from the spirit and scope of the invention as defined by the appended claims.

What is claimed is:

1. In a paper web having thereon a coating comprising pigment and adhesive, the improvement which comprises the adhesive consisting essentially of a mixture of latices comprising 50 to 98% of at least one latex which is not capable of being swelled or rendered soluble by alkali and 2 to 50% of at least one latex which is capable of being swelled or rendered soluble by alkali, the latex capable of being swelled or rendered soluble remaining in an unswelled or undissolved condition.

2. The coated paper web according to claim 1 wherein the latex capable of being swelled or rendered soluble by alkali is taken from the group consisting of acrylic copolymers, styrenebutadiene copolymers and vinyl acetate copolymers.

* * * * *